United States Patent
Kobayashi et al.

(10) Patent No.: US 6,348,930 B1
(45) Date of Patent: Feb. 19, 2002

(54) MOTION VECTOR PROCESSING CIRCUIT

(75) Inventors: Masayuki Kobayashi; Masamichi Nakajima; Hayato Denda, all of Kanagawa-ken (JP)

(73) Assignee: Fujitsu General Limited, Kawasaki (JP)

( * ) Notice: Subject to any disclaimer, the term of this patent is extended or adjusted under 35 U.S.C. 154(b) by 0 days.

(21) Appl. No.: 09/402,561

(22) PCT Filed: Jun. 19, 1998

(86) PCT No.: PCT/JP98/02753

§ 371 Date: Oct. 5, 1999

§ 102(e) Date: Oct. 5, 1999

(87) PCT Pub. No.: WO98/59336

PCT Pub. Date: Dec. 30, 1998

(30) Foreign Application Priority Data

Jun. 20, 1997 (JP) .............................................. 9-163818

(51) Int. Cl.[7] .................................................. G09G 5/34
(52) U.S. Cl. ........................ 345/672; 345/589; 345/690
(58) Field of Search ................................ 345/121, 123, 345/124, 125, 126, 147, 589, 672, 682, 683, 684, 690

(56) References Cited

U.S. PATENT DOCUMENTS 5,907,316 A * 5/1999 Mikoshiba et al. ......... 345/147
6,115,423 A * 9/2000 Shen et al. .................. 345/204

FOREIGN PATENT DOCUMENTS

| JP | 6-351000 | | 12/1994 |
| JP | 8-123355 | | 5/1996 |
| JP | 408130696 A | * | 5/1996 |
| JP | 9-138666 | | 5/1997 |

* cited by examiner

Primary Examiner—Jeffery Brier
(74) Attorney, Agent, or Firm—Flynn, Thiel, Boutell & Tanis, P.C.

(57) ABSTRACT

A motion vector difference detection stage 10 detects a difference D1 in motion vector between a current frame and a succeeding frame and a difference D2 in motion vector between a preceding frame and current frame. A latched circuit 50 outputs the motion vector S1 of the inputted current frame as a motion vector S2 in the case where both of the absolute values of the differences D1 and D2 does not exceed a preset value L1, and outputs the motion vector S1 of the frame preceding the corresponding frame as a motion vector S2 in the case where at least one of the absolute values of the differences D1 and D2 exceeds the preset value L1. The latched circuit 50 outputs a motion vector of 0 as a motion vector S2 in the case where both of the absolute values of the differences D1 and D2 exceed the preset value L1 and also the absolute value of the sum of the differences D1 and D2 exceeds the preset value L1. When a change in motion vector is small, the motion vector of the corresponding frame carries out dynamic image correction. When a change in motion vector is large, the small motion vector of the preceding frame or the motion vector of 0 carries out dynamic image correction.

6 Claims, 3 Drawing Sheets

MOTION VECTOR PROCESSING CIRCUIT

FIELD OF THE INVENTION

The present invention relates to a motion vector processing circuit for the processing of motion vector in correcting dynamic image in time-axis direction. This motion vector processing circuit is applicable, for example, to display devices such as the PDP (Plasma Display Panel) or LCD (Liquid Crystal Display) or the like having one frame divided into a plurality of subfields (or subframes) on time-sharing basis and being capable of displaying medium-gradation image.

BACKGROUND ART

Recently, the PDP and LCD have become popular as thin-type and large-screen display devices capable of displaying television pictures and the like. Conventionally, when displaying an image having medium-gradation such as that of a television picture, it has been a common practice to divide a frame into a plurality of subfields and make the subfields emit light according to the luminance level of input video signal. Such a display method of medium-gradation image differs from that of the CRT (Cathode Ray Tube) employing the dot-sequential scanning method. Therefore, some time lag occurs between the video signal generated by a television camera and a signal for display on a PDP or the like with respect to the display timing in a frame (or field), causing a blurring of the image of moving objects or formation of pseudo images. Therefore, according to prior art, in order to resolve such problems, the dynamic image is corrected by smoothing the amounts of movements of picture elements which form rapidly moving images on the basis of the detected motion vector within a frame of a video signal to be used for producing the image to be displayed.

However, as long as the motion vector processing for dynamic image correction is made on the basis of the motion vector detected within a frame, the processing in the time-axis direction adapted to the characteristic of human eye which works when following a moving object in a dynamic image cannot be applied, thereby giving rise to a problem that the corrected dynamic image will not match the function of human eye. For instance, when a motion vector detected on the basis of input video signal varies so rapidly during a frame that a human eye cannot follow, and a dynamic image is corrected on the basis of such a rapidly varying motion vector, this will cause the generation of dynamic image not harmonious with human eye.

The present invention is devised in consideration of the problems of the prior art and the object thereof lies in providing a motion vector processing circuit capable of performing the processing of motion vector in time-axis direction for enabling the dynamic image correction adapted to the movement of human eye.

DISCLOSURE OF THE INVENTION

The present invention relates to a motion vector processing circuit for correcting the dynamic image display characteristics of a display device having a frame divided into a plurality of subfields, the motion vector processing circuit comprising a motion vector difference detection means for detecting the differences among the motion vectors of N (N= any integer not smaller than 2) number of frames of video signals of the image to be displayed, a variation determination means for determining whether the value of the difference detected by the motion vector difference detection means is smaller than a preset value L1 or not, and an output control means for outputting the motion vector of a corresponding frame when the value of the detected difference is determined to be smaller than the preset value L1 by the variation determination means and outputting the motion vector of a frame, preceding the corresponding frame, having a detected difference smaller than the present value L1, when the detected difference is determined to exceed the preset value L1.

When the variation of the motion vector between given frames is small, that is, when the value of difference detected by the motion vector detection means is smaller than the preset value L1, the value of detected difference is determined to be less than the preset value L1 by the variation determination means, so that the motion vector of the corresponding frame is output from the output control means. When the variation of the motion vector between given frames is relatively large, that is, when the value of difference detected by the motion vector difference detection means exceeds the preset value L1, the value of the detected difference is determined to exceed the preset value L1 by the variation determination means, so that the motion vector of a frame, preceding the corresponding frame, having a detected difference smaller than the preset value L1 is output. Therefore, when the variation of the motion vector is relatively small, it becomes possible for the dynamic image to be corrected by the motion vector of the corresponding frame. On the other hand, when the variation of the motion vector is relatively large, it is possible for the dynamic image to be corrected by a motion vector whose variation is smaller than that of the motion vector of the corresponding frame, whereby a dynamic image display harmonious with the function of the human eye can be realized.

Further, in the motion vector processing circuit according to the present invention, the motion vector difference detection means detects the difference D1 between the motion vector of a present frame and the motion vector of the immediately following frame and the difference D2 between the motion vector of the present frame and that of the immediately preceding frame; the variation determination means determines whether both the differences D1 and D2 is less than the preset value L1; the output control means outputs the motion vector of the present frame when both the differences D1 and D2 are determined to not exceed the preset value L1, and outputs the motion vector of a frame, preceding the present frame, whose difference exceeds the preset value L1, when at least one of the differences D1 and D2 is determined to exceed the preset value L1. When the circuit is composed in this way, construction of each component can be simplified.

Further, the variation determination means is additionally provided with a function to determine whether or not both the differences D1 and D2 exceed the preset value L1, and the output control means is additionally provided with a function to output the motion vector having value of 0 (i.e., the value of motion vector =0) when both the differences D1 and D2 are determined to be exceeding the preset value L1. Thus, where the circuit is composed in this way, when both the differences D1 and D2 exceed the preset value L1, the output control means will not output the zero-value motion vector for correcting dynamic image, whereby excessive correction of dynamic image can be prevented even in such a case where the motion vector varies largely during successive 2 or more frames.

Further, the variation determination means is additionally provided with a function for determining whether or not the absolute values of both the differences D1 and D2 are exceeding the preset value L1, and the output control means is additionally provided with a function for outputting zero-value motion vector when it is determined that the absolute values of both the differences D1 and D2 exceed the preset value L1 and the absolute value of the sum of the differences D1 and D2 and a function for inhibiting output of zero-value motion vector when the absolute value of the sum of the differences D1 and D2 is less than the preset value L1 even if the absolute values of both the differences D1 and D2 exceed the preset value L1. When the circuit is composed in this way, even when the absolute values of both the differences D1 and D2 are exceeding the preset value L1, the output control means outputs zero-value motion vector only when the absolute value of the sum of the differences D1 and D2 is exceeding the preset value L1 and inhibit the output of the zero-value motion vector when the absolute value of the sum of the differences D1 and D2 is less than the preset value L1, whereby the dynamic image can be corrected in consideration of the direction of variation of the motion vector.

Further, the motion vector difference detection means is composed of a first frame memory and a second frame memory for outputting an input motion vectors after sequentially giving a time lag corresponding to each frame, a first difference-computation arithmetic unit for calculating the difference D1 between the motion vector input to the first frame memory and the motion vector output from the first frame memory, a second difference-computation arithmetic unit for computing the difference D2 between the motion vector output from the first frame memory and the motion vector output from the second frame memory. When the above means is composed in this way, the motion vector difference detection stage can be composed of two frame memories and 2 difference-computation arithmetic units.

Further, the motion vector difference detection means comprises the first frame memory for outputting an input motion vector after giving a time lag corresponding to one frame, the difference-calculation arithmetic unit for calculating the difference D1 between the motion vector input to this first frame memory and the motion vector output from the first frame memory, and the second memory frame for outputting the difference D1 calculated by the difference-calculation arithmetic unit after giving a time lag corresponding to one frame. When composed in this way, the motion vector difference detection means can be composed of two frame memories and 1 difference-calculation arithmetic unit.

BEST MODE FOR CARRYING OUT THE INVENTION

In the following, the present invention will be described in detail referring to accompanying drawings.

Figure 1:
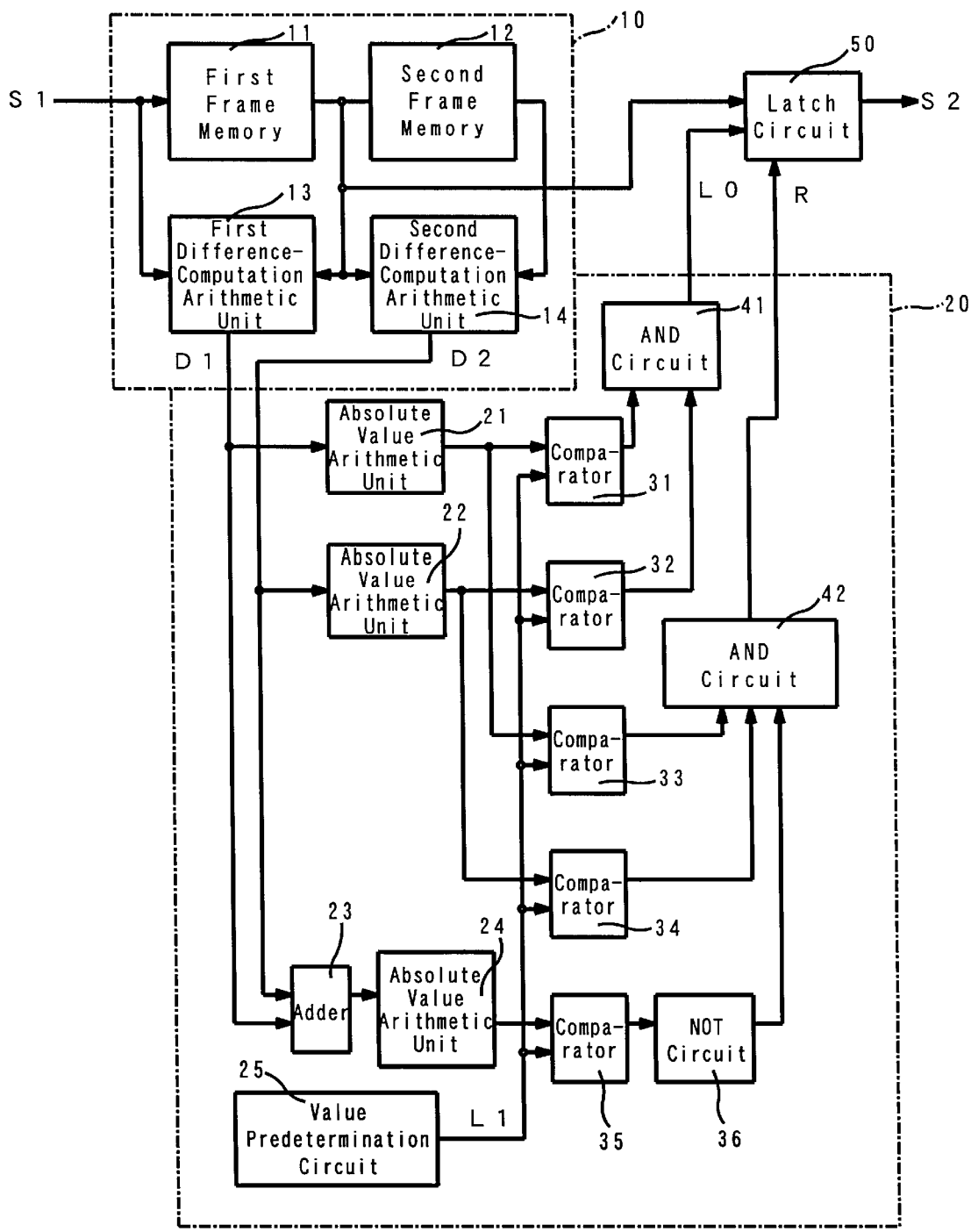
FIG. 1 is a block diagram showing a motion vector processing circuit as an embodiment of the present invention.

FIG. 1 shows an embodiment of the motion vector processing circuit according to the present invention. In FIG. 1, numeral 10 denotes the motion vector difference detection stage comprising the first frame memory 11 and the second frame memory 12, which output the input motion vector after sequentially giving a time lag corresponding to one frame, the first difference-computation arithmetic unit 13 for detecting the difference D1 between the motion vector of immediately following frame input to the first frame memory 11 and the motion vector of present frame output from the first frame memory 11, and the second difference-computation arithmetic unit 14 for detecting the difference D2 between the motion vector of the present frame output from the first frame memory 11 and the motion vector of immediately preceding frame output from the second frame memory 12.

The motion vector S1 represents the direction and magnitude (velocity of motion) of the block concerned (e.g., an object) in displayed image and is detected in a manner described in the following.

In a case where the frame of the image to be displayed is divided into 8×8 picture element blocks, and the motion vector is detected for each block, the correlative values (e.g., difference values) of a video signal corresponding to all the blocks within the image in immediately preceding frame are determined with respect to the blocks (of 8×8 picture elements), and the motion vector, starting from the position of the block of the image in the immediately preceding frame wherein the correlative values become minimum and ending at the origin where the value of the motion vector is 0, is detected as a motion vector of the present frame.

Numeral 20 denotes the difference determination stage comprising absolute value computation arithmetic units 21 and 22 for computing and outputting the absolute values |D1| and |D2| of the differences D1 and D2, an adder 23 for adding the differences D1 and D2, an absolute value arithmetic unit 24 for computing for output the absolute value |D1+D2| from the sum (D1+D2), a comparator 31 for comparing the absolute value |D1| with preset value L1 which is predetermined by value predetermination circuit 25 and outputting H-level signal when $|D1| \leq L1$ while outputting L-level signal when $|D1|>L1$, a comparator 32 for comparing the absolute value |D2| with the preset value L1 and outputting H-level signal when $|D2| \leq L1$ while outputting L-level signal when $|D2|>L1$, a comparator 33 for comparing the absolute value |D1| with the preset value L1 and outputting H-level signal when $|D1|>L1$ while outputting L-level signal when $|D1| \leq L1$, a comparator 34 for comparing absolute value |D2| with the preset value L1 and outputting H-level signal when $|D2|>L1$ while outputting L-level signal when $|D2| \leq L1$, a comparator 35 for comparing absolute value |D1+D2| with preset value L1 and outputting H-level signal when $|D1+D2| \leq L1$ while outputting L-level signal when $|D1+D2|>L1$, a NOT circuit for inverting for output the output signal from the comparator 35, an AND circuit 41 for outputting AND signal of the signals output from the comparators 31 and 32 and an AND circuit 42 for outputting AND signal of the signals output from the Comparators 33, 34 and NOT circuit 36.

Numeral 50 denotes a latch circuit as an example of the Output control means. The latch circuit 50 processes the signal output from the AND circuit as a load signal L0 and loads for latching (storing) the motion vector of the present frame output from the first frame memory 11 when the signal L0 is of H-level and outputs as motion vector S2, but, when the signal L0 is of L-level, the latch circuit 50 will not load the motion vector of the present frame in order to output the previously latched motion vector as motion vector S2.

Further, the latch circuit 50 processes the output signal from the AND circuit 42 as a reset signal R, is controlled by the signal L0 output from the AND circuit 41 when the reset signal R is of L-level, and invalidates the control by the signal L0 from the AND circuit 41 to output the zero-value motion vector as the motion vector S2 when the signal R is of H-level.

Next, the function of the embodiment shown in FIG. 1 will be described referring to FIG. 2. For convenience, explanation will be made as to the case where N=3 and L1=1.

(1) When the absolute values of variations of motion vectors among three frames, namely, the preceding frame, present frame and following frame are less than the preset value L1, the absolute values of both the differences D1 and D2 detected by the motion vector difference detection stage 10 are less than the preset value L1, so that both the signals output from the comparators 31 and 32 and the signal L0 output from the first AND circuit are of H-level respectively, and the latch circuit 50 loads the motion vector of the present frame for latching. For instance, as shown in FIG. 2 ①, when the motion vectors of the immediately preceding frame, present frame and immediately following frame are 0, 1 and 1 respectively, D1=0 and D2=+1, both of which are less than the preset value L1, so that the motion vector 1 of the present frame becomes output motion vector S2. In this case, the signal R output from the comparators 33 and 34 and output from the AND circuit 42 are of L-level, so that the latch circuit 50 will never be reset.

(2) When either the absolute value of variation of motion vector between the immediately preceding frame and the present frame or the absolute value of variation of motion vector between the present frame and immediately following frame exceeds the preset value L1, one of the absolute values of differences D1 and D2 detected by the motion vector difference detection stage 10 becomes larger than the preset value L1, and, since one of the signals output from the comparators 31 and 32 is of L-level, the signal L0 output from the AND circuit 41 is L-level, the latch circuit 50 outputs the motion vector which has previously been loaded for storing. For instance, as shown in FIG. 2 ② or ③, when the motion vectors of the immediately preceding frame, present frame and immediately following frame are 1, 3 and 3, or 4, 9 and 9, D1=0 and D2=+2 or D1=0 and D2=+5, and, since D2 exceeds L1(=1), the motion vector 2 or 4 which has previously been loaded for storing by the latch circuit 50 becomes an output motion vector S2. In this case, one of the signals output from the comparators 33 and 34 is of L-level, so that the output signal R from the AND circuit 42 also become L-level, and the Latch circuit 50 will never be reset.

(3) When both the absolute value of variation in motion vector between the immediately following frame and the present frame and the absolute value of variation in motion vector between the present frame and immediately preceding frame exceed the preset value L1, both the absolute values of the differences D1 and D2 detected by the motion vector difference detection stage 10 become larger than the preset value L1, and the outputs from the comparators 31 and 32 are of L-level, while the outputs from the comparators 33 and 34 become H-level. In this case, the motion vector output S2 from the latch circuit 50 varies depending on whether or not the absolute value of the sum of the variation of motion vectors between the immediately following frame and the variation between the present frame and immediately preceding frame is less than L1.

(3a) A case where the absolute value of the sum of the variations is less than L1:

When the absolute value of the sum of the variations is less than L1, the signal output from the NOT circuit 36 is of L-level, so that the signal R output from AND circuit 42 becomes L-level. Therefore, the latch circuit 50 will not be reset, but the motion vector, which has previously been loaded for latching, will be output as motion vector 2. For instance, as shown in FIG. 2 ④, when the motion vectors of immediately preceding frame, present frame and immediately following frame are 7, 3 and 7 respectively, D1=+4 and D2=−4, while |D1+D2|=0 or less than L1 (=1), so that the motion vector 8, which has previously been loaded for latching, becomes output motion vector S2.

(3b) A case where the absolute value of the sum of variations exceeds preset value L1:

When the absolute value of the sum of variations exceeds the preset value L1, the level of the signal output from NOT circuit 36 varies to H level, so that the level of signal R output from the AND circuit 42 becomes H level to reset the latch circuit 50. Therefore, the latch circuit 50 outputs a zero-value motion vector as motion vector S2. For instance, as shown in FIG. 2 ⑤, when the motion vectors of immediately preceding frame, present frame and immediately following frame are 7, 9 and 2 respectively, D1=−7 and D2=+2, while |D1+D2|=5 or exceeds L1 (=1), so that a zero-value motion vector is output as motion vector S2.

Figure 3:
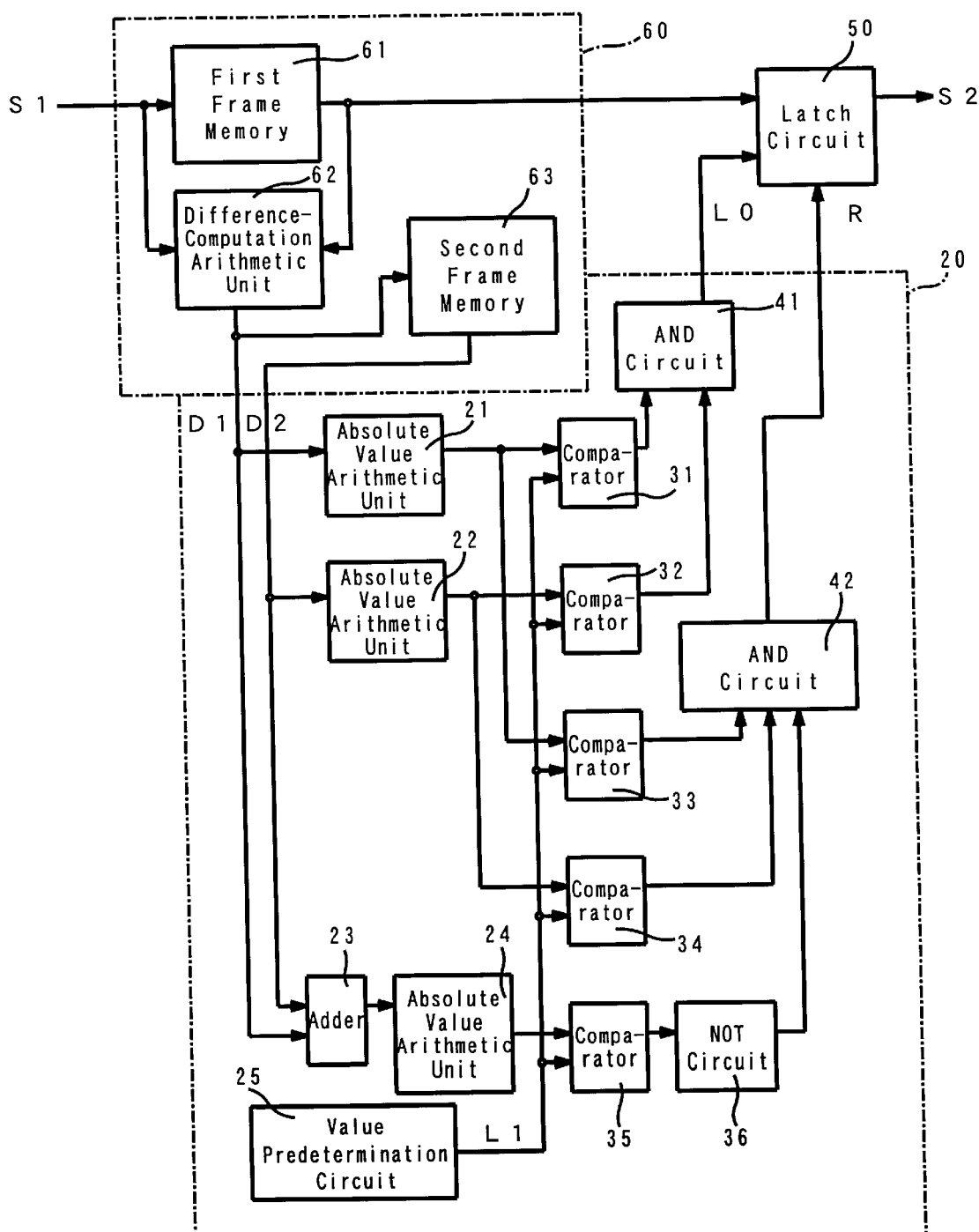
FIG. 3 is a block diagram shown in a motion vector processing circuit as another embodiment of the present invention.

FIG. 3 shows a motion vector difference detection stage as another embodiment of the invention shown in FIG. 1. In this figure, the descriptions of those parts which are common to those in FIG. 1 are omitted.

In FIG. 3, numeral 60 denotes the motion vector difference detection stage comprising a first frame memory 61 for outputting input motion vector S1 after giving a time lag corresponding to one frame, a difference-computation arithmetic unit 62 for detecting the difference D between the motion vector input to and the motion vector output from the first frame memory 61 and a second frame memory 63 for outputting the difference D output from the difference-computation arithmetic unit 62 after giving a time lag corresponding to one frame, wherein the difference D output from the difference-computation arithmetic unit 62 is output as difference D2 between the motion vector of the present frame and the motion vector of immediately preceding frame.

The description of the function that the variation Determination stage 20 determines the variation on the basis of the differences D1 and D2 output from the motion vector difference detection stage 60, and the latch circuit 50 outputs the corresponding motion vector S2 on the basis of the determination signal is omitted here, since this function is identical with that described in FIG. 1.

The embodiment described above is concerned with the Variation detection stage 20 provided with a function for determining whether or not the absolute values of both the differences D1 and D2 are less than the preset value L1, a function for determining whether or not at least one of the absolute values of the differences D1 and D2 exceeds the preset value L1, a function for determining whether or not the absolute value of the sum of the differences D1 and D2 is less than the preset value L1 when the absolute values of both the differences D1 and D2 exceed the preset value L1, and also concerned with the latch circuit 50 having a function for loading and outputting the motion vector of the present frame when both the absolute values of the differences D1 and D2 are less than the preset value L1, a function for outputting the motion vector, which has previously loaded and latched, when at least one of the absolute values of the differences D1 and D2 exceeds the preset value L1 and a function for outputting zero-value motion vector when both the absolute values of differences D1 and D2 and the absolute value of the sum of the differences D1 and D2 exceed the preset value L1, and the absolute value of the sum of the differences D1 and D2 exceeds, but the present invention is not limited to this embodiment.

Figure 2:
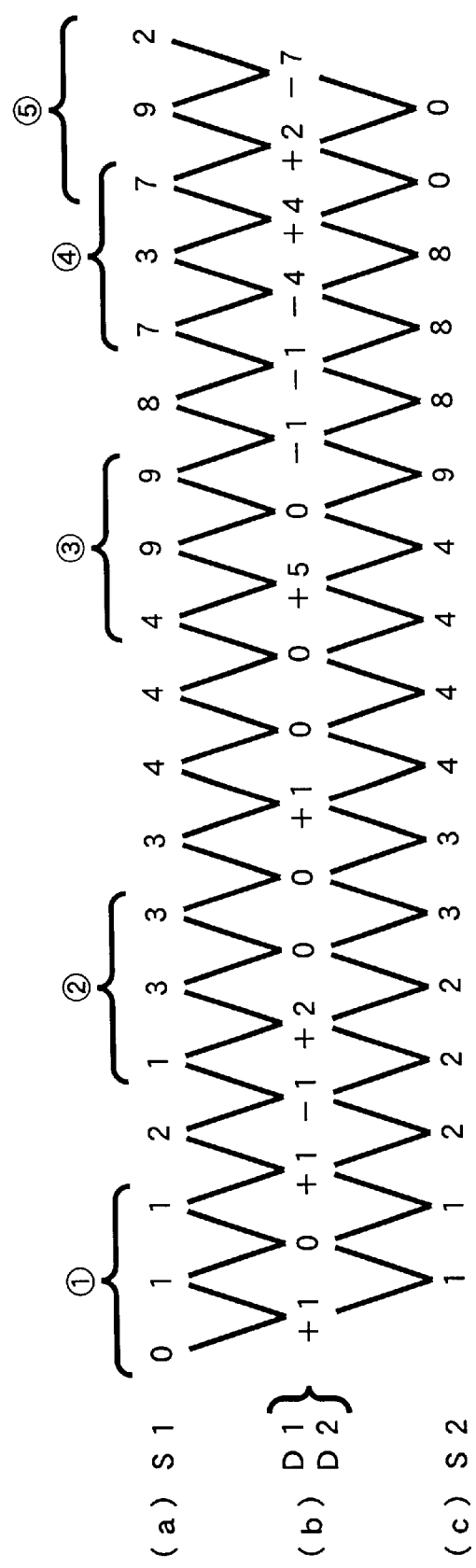
FIG. 2 is a diagram for illustrating the function of the circuit shown in FIG. 1.

For instance, the present invention is also applicable to a case where the adder 23, absolute value arithmetic unit 24, comparator 35 and NOT circuit 36 shown in FIG. 1 and FIG. 2 are omitted so that only the output signals from the comparators 33 and 34 are input to AND circuit 42, and the latch circuit 50 is reset to output zero-value motion vector when the absolute values of both the differences D1 and D2 exceed the preset value L1.

Further, the present invention is applicable to a case where not only the adder 23, absolute value aritmetic unit 24, comparator 35 and NOT circuit 36 but also the comparators 33 and 34 and AND circuit 42 are omitted so that the latch circuit 50 does not have the resetting function.

For the above embodiment, a case where N=3 is described, but the present invention is not limited to this embodiment and is applicable to the case were N=2 or N=4 or more For instance, the present application is also applicable to a case where, when N=4, the motion vector difference detection stage comprises 3 frame memories, 3 difference-computation arithmetic units, or 3 frame memories and 1 difference-computation arithmetic unit in order to detect the differences D1, D2 and D3 among the motion vectors of 4 frames, and the variation determination stage determines whether or not all the absolute values of the differences D1, D2 and D3 are less than the preset value L1, whether or not at least one of the absolute values of the differences D1, D2 and D3 exceeds the preset value L1 and whether or not the absolute value of the sum of the differences D1, D2 and D3 exceeds the preset value L1.

INDUSTRIAL AVAILABILITY

As described in the foregoing, the present invention is applicable to the display device such as the PDP wherein one frame is divided into a plurality of subfields on time-sharing basis to display the image having medium gradation. Further, according to the present invention, the dynamic image can be corrected harmoniously with the movement of human eye by correcting the dynamic image on the basis of the motion vector processed with respect to its time axis. Therefore, the dynamic image can be displayed harmoniously with the eyes of a dynamic image viewer, thereby improving the display characteristic of the display device.

What is claimed is:

1. A motion vector processing circuit designed for correcting the dynamic image display characteristic of a display device having one frame divided into a plurality of subfields on a time-sharing basis and capable of displaying images of medium gradation, the motion vector processing circuit comprising a motion vector difference detection means for detecting the differences of motion vectors of N number, N being equal to any integer not less than 2, of frames of video signals for display of images, a variation determination means for determining whether or not a value detected by the motion vector difference detection means is less than a preset value L1 and an output control means for outputting the motion vector of a corresponding frame when the detected difference of the motion vector is determined to be less than the preset value L1 by the variation determination means and outputting the motion vector of a frame, preceding the corresponding frame, whose detected motion vector difference is less than the preset value L1, when the detected motion vector difference is determined to exceed the preset value L1.

2. A motion vector processing circuit according to claim 1, wherein the motion vector difference detection means detects a difference D1 between a motion vector of a present frame and a motion vector of the immediately following frame and a difference D2 between the motion vector of the present frame and a motion vector of the immediately preceding frame; the variation determination means determines whether or not both the differences D1 and D2 are less than the preset value L1; the output control means outputs the motion vector of the present frame when both the differences D1 and D2 are determined to be less than the preset value L1 and outputs the motion vector of a frame, preceding the present frame, whose difference exceeds the preset value L1, when at least one of the differences D1 and D2 is determined to exceed the preset value L1.

3. A motion vector processing circuit according to claim 2, wherein the variation determination means is provided with a means for determining whether or not both the differences D1 and D2 exceed the preset value L1 and the output control means is provided with a means for outputting a zero-value motion vector when both the differences D1 and D2 are determined to exceed the preset value L1.

4. A motion vector processing circuit according to claim 2, wherein the variation determination means is provided with a means for determining whether or not the absolute values of both the differences D1 and D2 exceed the preset value L1 and a means for determining whether or not the absolute values of both the differences D1 and D2 exceed the preset value L1 and the absolute value of the sum of the differences D1 and D2 exceeds the preset value L1, and the output control means is provided with a means for selectively outputting a zero-value motion vector or a motion vector of a frame, preceding the present frame, whose difference exceeds the preset value L1, depending on whether or not the absolute value of the sum of the differences D1 and D2 exceed the preset value L1, where both the absolute values of the differences D1 and D2 exceed the preset value L1.

5. A motion vector processing circuit according to claim 2, wherein the motion vector difference detection means comprises first and second frame memories for sequentially outputting input motion vectors after giving them a time lag corresponding to one frame, a first difference-computation arithmetic unit for computing a difference D1 between a motion vector input to the first frame memory and a motion vector output from the first frame memory and a second difference-computation arithmetic unit for computing a difference D2 between the motion vector output from the first frame memory and a motion vector output from the second frame memory.

6. A motion vector processing circuit according to claim 2, wherein the motion vector difference detection means comprises a first frame memory for outputting an input motion vector after giving it a time lag corresponding to one frame, a difference-computation arithmetic unit for computing a difference D1 between the motion vector input to the first frame memory and a motion vector output from the first frame memory, and a second frame memory for outputting the difference D1 obtained by the difference-computation arithmetic unit as a difference D2 after giving it a time lag corresponding to one frame.

* * * * *